United States Patent Office 3,375,384
Patented Mar. 26, 1968

3,375,384
SYNCHRONOUS MOTOR HAVING PERMANENT
MAGNETIC ROTORS
Richard Thees, Aachen, Germany, assignor to North
American Philips Company, Inc., New York, N.Y.,
a corporation of Delaware
Filed Oct. 9, 1963, Ser. No. 315,009
Claims priority, application Germany, Oct. 18, 1962,
N 22,229
13 Claims. (Cl. 310—156)

The invention relates to a single-phase or polyphase synchronous motor comprising a stator, at least one stator winding and a permanent magnetic rotor having at least one pair of poles.

Synchronous motors having a rotor made of permanent magnetic material are known. Motors of this type generally comprise a multipolar hollow cylinder made of isotropic magnetic material as the rotor magnet, or blocks of an isotropic magnetic material which together with ferromagnetic pole pieces form cylindrical rotors. The stator windings generally have a small number of turns.

Such motors have a small induced back-E.M.F. E, which further more does not vary sinusoidally at all. Especially if ferromagnetic pole pieces are used, the stator circuit has a high magnetic conductivity and hence the stator winding has a large inductance L, which generally varies over one revolution of the rotor. Especially in rotors having ferromagnetic pole pieces, the ratio between the reactance X and the overall resistance R exceeds 5, that is to say, $\tan a = X/R > 5$. The ratio between the back-E.M.F. E and the terminal voltage U, especially in hollow-cylinder magnets, is smaller than 0.5.

These motors are not capable of achieving the theoretical maximum possible output power $P_a = U^2/4R$. In addition, they have a large volume relative to the power output. Furthermore, in general, and in particular in motors of small power, the efficiency is low, e.g. less than 50%.

In accordance with the invention, I have discovered that a synchronous motor which is designed so that the value of $\tan \alpha = X/R$ lies between 0 and 5, the value of E/U between 0 and 1.2, and $\tan \alpha$ is always greater than 4 minus 6.5 E/U will produce a motor which closely approximates the maximum theoretical power limit and at the same time achieves a high efficiency of, for example, more than 50 percent.

The symbols used are defined as follows:

E is the effective value of the terminal voltage determined by measurements made on the stator winding when the motor is driven at synchronous speed and the stator current is 0.

U is the effective value of the terminal voltage set up across the series connection of the motor stator winding and a capacitor which may precede it.

ω is the angular frequency of the terminal voltage.

R is the overall resistance of the stator winding measured as the ratio $U_r/I_r$, where $U_r$ is the voltage across the series connection of the stator winding and a capacitor, which may precede it. The capacitance of the capacitor may be chosen so that the series circuit comprising the capacitor and stator winding are tuned to resonance, whereby a resonance current $I_r$ flows therein. Since the overall resistance R comprises the ohmic resistance of the winding and the imaginary resistance which represent the eddy-current and hysteresis losses, it is dependent upon the amplitude of the current. Hence $I_r$ must be the current which the motor consumes in the operative condition, for example, the current which the motor consumes when its power output corresponds to one half of the pull-out power. The term "pull-out power" is to be understood to mean the power associated with the pull-out torque.

Z is the impedance $\sqrt{R^2 + X^2}$ measured as the ratio $U_o/I_r$, where $U_o$ is that voltage across the series connection of the stator winding and the capacitor which may precede it at which a current flows having a value which corresponds to that of the resonance current $I_r$.

X is the reactance of the stator circuit and equals $$\omega L - \frac{1}{\omega C}$$

The value of X can be determined from the values of R and Z by solving $X = \sqrt{Z^2 - R^2}$, wherein Z and R are determined as above.

C is the capacitance of a capacitor which may precede the stator winding.

L is the inductance of the stator winding and can be determined from $$L = \frac{X}{\omega} + \frac{1}{\omega^2 C}$$

Typical examples of devices in which it has not been possible hitherto to use the known synchronous motors are gramophones and electric shaving apparatus.

Gramophones generally use non-synchronous motors having a power output of about 0.5 watt, an efficiency of about 10% and a volume of 230 cubic centimeters per watt. In contradistinction thereto, a synchronous motor in accordance with the invention, with a pull-out power of 2 watts, has an efficiency exceeding 50% and a volume of 46 cubic centimeters per watt. In addition, the motor in accordance with the invention has all the advantage of a synchronous motor which has no brushes and runs at a speed which is independent of the load.

Electric shaving apparatus generally use series motors having a power output of about 4 watts (at a speed of about 9,000 revolutions per minute which has to be reduced by a reduction gear), an efficiency not exceeding 30% and a volume of about 15 cubic centimeters per watt.

In contradistinction thereto, a motor in accordance with the invention has the important advantage that, for example, at a pullout power of about 6 watts (at a speed of 3,000 revolutions per minute appropriate to electric shaving apparatus), an efficiency exceeding 60% and a volume of 6 cubic centimeters per watt are obtained. Although a series motor can be satisfactorily prevented from producing interference, a further important advantage of the motor in accordance with the invention is that, due to the absence of a commutator, it cannot give rise to interfernce in radio and television receivers. Furthermore, since there are no brushes to wear out, the life of the motor without servicing is prolonged.

The construction and the properties of these motors which are claimed will now be described more fully with reference to the figures of the accompanying drawings, in which:

Figure 1:
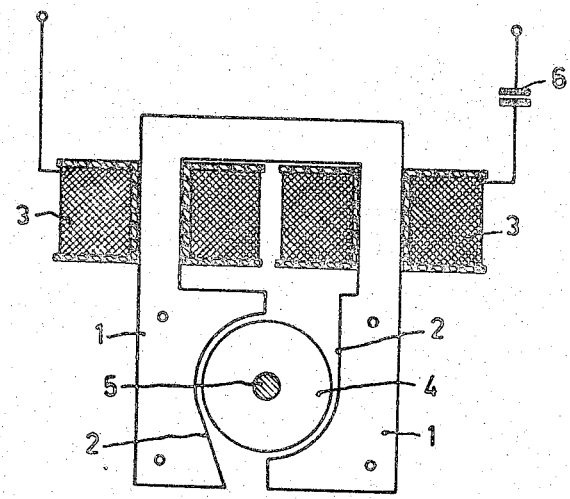
FIG. 1 shows an embodiment of a motor in accordance with the invention having a pair of stamped stator poles and a single pair of rotor poles.
Figure 6:
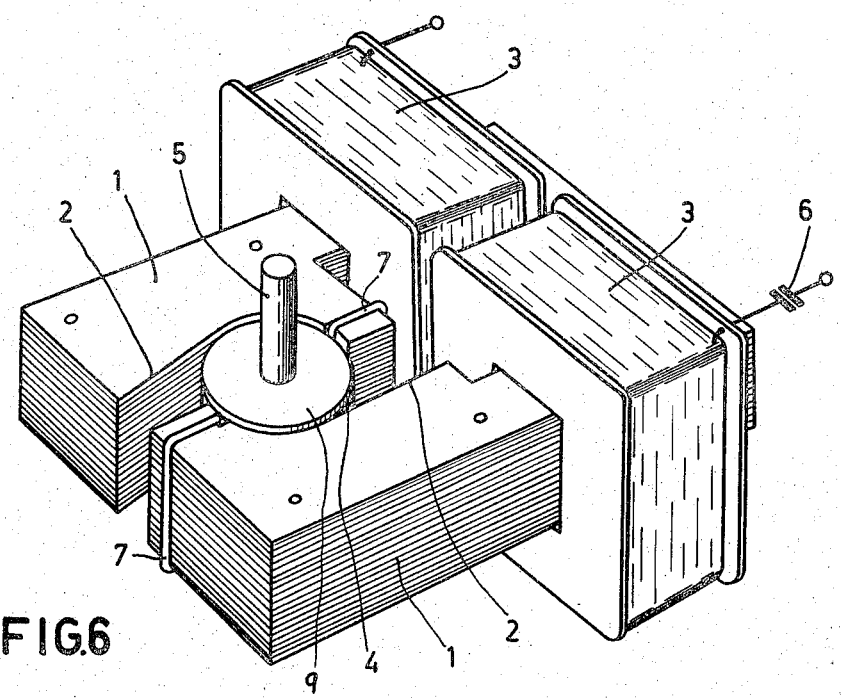
FIG. 6 is a perspective view of the motor of FIG. 1 further showing an auxiliary stator winding for improving the starting characteristic of the motor.

FIGS. 1 and 6 show a motor having a stator which comprises a laminated iron circuit having a pair of stamped poles 1. The circumference of the stator pole is not circularly symmetrical but diverges, as FIG. 1 shows, tangentially at two diametrically opposite pole ends. The limbs of the stator carry a winding 3 having $w$ turns, which may be preceded by a capacitor 6. The bearings for the rotor are secured to the stator poles. In order to increase the starting torque of the motor, an auxiliary winding 7 is mounted on the stator so as to produce an auxiliary rotating magnetic field. In addition, the rotor 4 may be composed of a hysteretic material so that the motor develops a hysteretic torque.

The rotor 4 consists of a cylindrical, diametrically magnetised permanent magnet. A shaft 5 is secured in the rotor.

The inventive idea consists in that motors having the above described properties are obtained if, in addition to the desired ratio $L/U$ produced by a diametrically magnetised permanent-magnetic rotor of high inductance and by a large number of turns of the stator winding, the angle $\alpha$ is also reduced to a small value by a very small magnetic conductivity and/or, as the case may be, a preceding capacitor.

A further advantage of the invention is that due to the diametrically magnetized cylindrical magnet rotor, the induced voltage $E$ is sinusoidal and includes a negligible proportion of harmonics.

The low magnetic conductivity of the stator circuit is obtained by a preferably low reversible permeability of the rotor magnet, which for the stator circuit forms a path of low magnetic conductivity which is about ten times smaller than is formed by the air gap in known motors. Attention should be paid to the fact that the stator iron, due to its magnetic properties, determines the working point of the rotor magnet and hence the value of $L$, which must be as large as possible, for a given speed. This results in the constructional requirement that the stator must be made of high-quality material. The desired low-magnetic conductivity for the magnetic field of the winding is exclusively determined by the part of the magnetic circuit of the stator winding that is formed by the rotor magnet of preferably low reversible permeability, and the stray flux of the stator coil, which should be a minimum.

The great length of the rotor magnet in the longitudinal direction of the magnetic stator circuit, that is to say, a maximum diameter of the cylindrical rotor magnet of preferably low reversible permeability, which is desired with a view to a low $L/R$, has the further advantage that the operating line of the rotor magnet is situated particularly favourably with a view to a high magnetic induction or, regarded from another point of view, that the air gap between the rotor and the stator has only a small influence on the magnetic induction of the rotor, and hence on $E$. The practicable rotor diameter is limited by the starting behaviour of the motor.

It is further of advantage that the cylindrical rotor magnet is homogeneous with respect to its magnetic conductivity. As a result the inductance of the winding is constant over a revolution of the stator rotor if the relative permeability of the stator iron is constant. In this event the current is sinusoidal if $E$ and $U$ are sinusoidal.

In accordance with the invention, for motors to achieve a high efficiency of, for example, more than 50% and $U^2/4R$, $E/U$ and $\alpha$ lie within sharply defined limits and have a predetermined mutual relationship.

Motors having a satisfactory efficiency are obtained in the following region.

Figure 2:
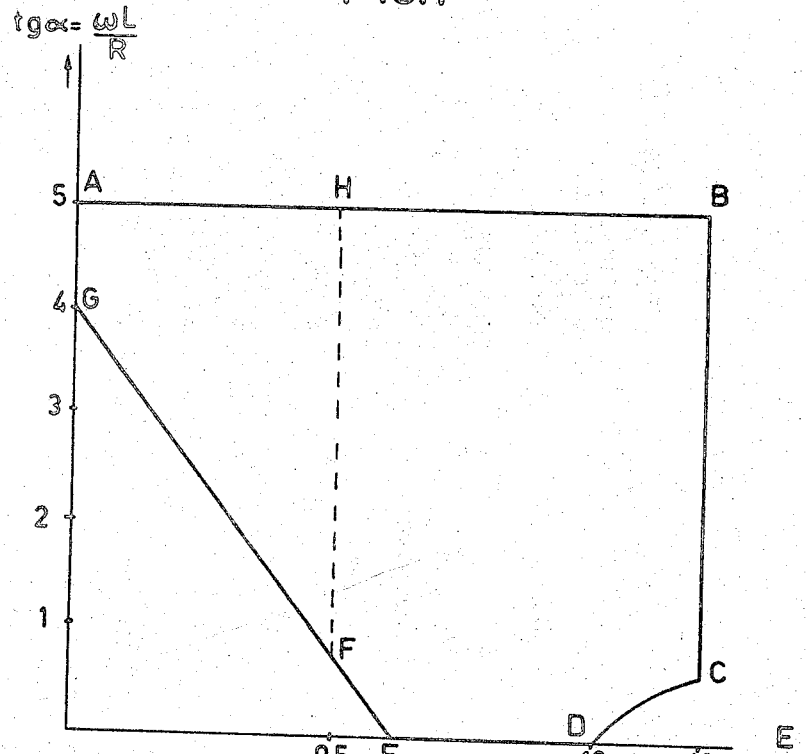
FIG. 2 is a diagram illustrating the operation of motors in accordance with the invention, in which tan α is plotted against E/U.

If tan $\alpha = X/R$ is plotted against $E/U$, the region claimed in accordance with the invention in this graph may be delimited in the following manner:

Tan $\alpha$ lies between the values 0 and 5, with the exception of those values at which tan $\alpha$ is smaller than 4 minus 6.5 $E/U$, and $E/U$ lies between the values 0 and 1.2, if it is taken into account that operation of the motor is only possible if cos $\alpha \leq U/E$ (see the area ABCDEFG in FIG. 2).

If we limit ourselves only to motors which have a maximum efficiency of 50% or more at a predetermined power output, we have the further restriction that $E/U$ lies within the limits 0.5 and 1.2 (see the area BCDEFH in FIG. 2).

The relationship between the angle $\alpha$ and $E/U$ and the resulting preferred values is shown by the following consideration. The additional condition is introduced that $E \cos \alpha/U$ lies within the limits 0.15 and 0.83 and $E/U$ within the limits 0.5 and 1.2 (FIG. 3).

Figure 3:
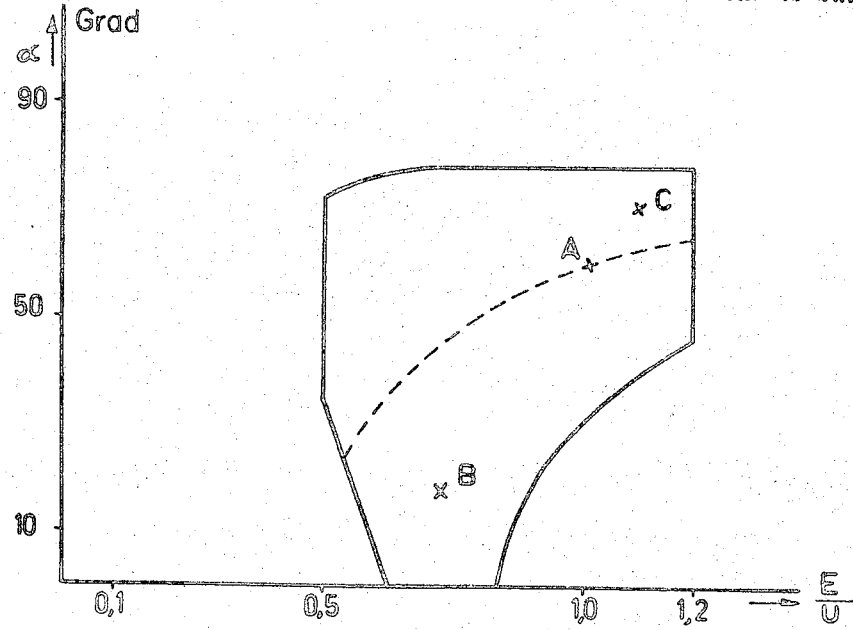
FIG. 3 is a diagram in which α is plotted against E/U and the broken line relates to motors having an efficiency of 50% and a pull-out power of $U^2/4R$.
Figure 4:
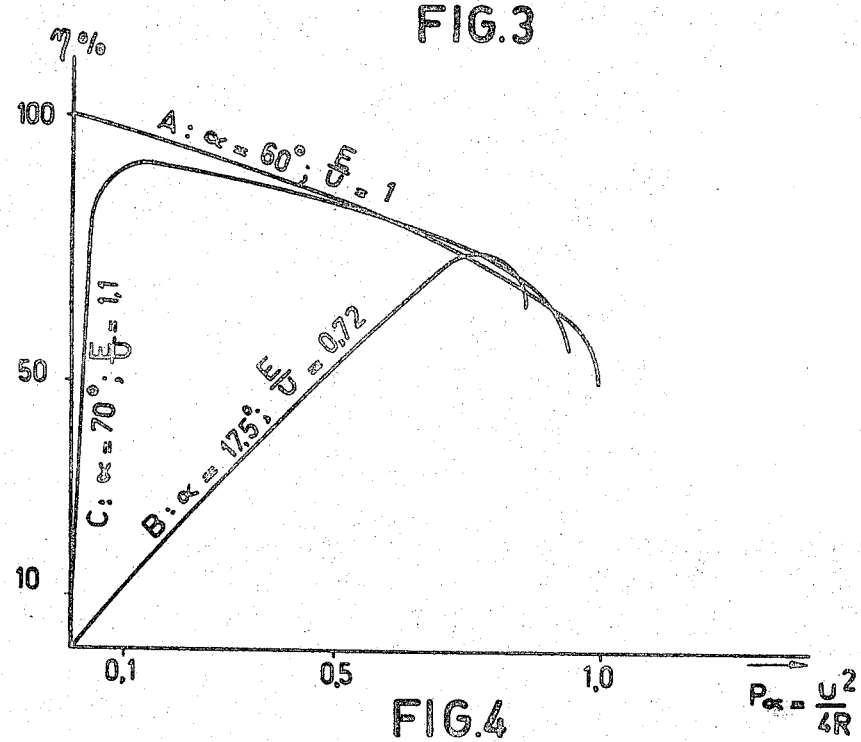
FIG. 4 shows the efficiency-power curves of three motors illustrated by FIG. 3.

FIG. 4 shows the efficiency-power curve of three motors, the values $E/U$ and $\alpha$ of which are shown in FIG. 3. If the relationship between the efficiency, expressed as a percentage, of a motor satisfying these conditions, and the output power, standardized to $U^2/4R$, is considered, and the area under the curves is regarded as a quality factor for efficiency and power output, it will be seen that the theoretically maximum power $P_a = U^2/4R$ is always obtained at an efficiency of 50% if $E \cos \alpha/U$ is equal to 0.5, and that the area under the efficiency curve, considered as a quality factor, becomes a maximum if $\alpha = 60°$ (shown by a broken line in FIG. 3). Other parameters, such as the volume per watt, the overloading capacity or the efficiency and constancy of the working point, however, may render it desirable that $E/U$ and $\alpha$ have values different from the said preferred values. However, in accordance with the invention, an efficiency exceeding 50% and a large power per unit of volume are always obtained in this area.

Generally motors in accordance with the invention are self-starting by oscillation if the inertial masses rigidly secured to the rotor shaft do not exceed a predetermined value, as is the case, for example, in an electrical shaving apparatus. In a single-phase motor, the condition obtains that with a non-energized stator coil the bipolar magnet rotor is not in a rest position in which its magnetic induction is parallel to the magnetic field of the stator coil, for otherwise the rotor in its rest position is in unstable equilibrium when the stator winding is energized and is not excited to oscillation, that is to say, it must be set into motion for starting. Consequently, the motor must be designed, for example, by means of an asymmetrical shape of the stator, so that when the stator winding is not energized the rotor is in a rest position in which its magnetic induction is at an angle to the direction of the resulting field of the winding. This angle preferably should exceed 5° (FIG. 1).

Figure 5:
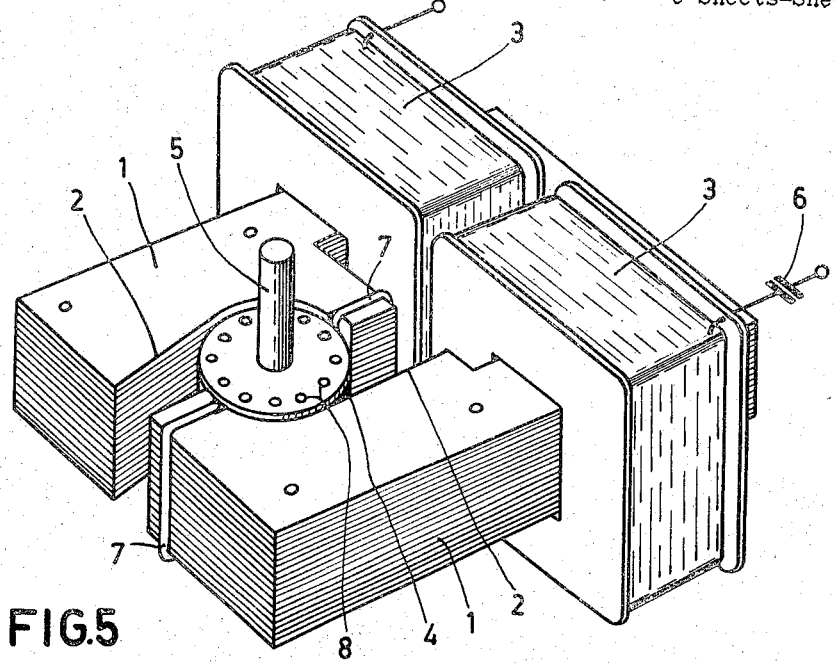
FIG. 5 is a perspective view of another embodiment of the invention that includes a squirrel cage rotor.

If the inertial mass rigidly connected to the rotor shaft is so large as to prevent the motor from starting by oscillating into synchronism, as may be the case, for example, in a gramophone, special steps may be taken for self-starting, in addition to mechanical expedients, for example, a slipping or centrifugal clutch. If, as shown in FIG. 5, the stator is provided in known manner with an auxiliary winding 7 so that a rotating magnetic field is produced, and the rotor 4 is provided with a squirrel cage 8, the motor produces an additional asynchronous starting torque before it reaches the synchronous speed.

What is claimed is:
1. A synchronous motor comprising a stator composed of magnetic material, at least one stator winding mounted thereon, a permanent magnet rotor having at least one pair of poles and moutned to rotate within said stator, a pair of input terminals for supplying alternating current energy to said stator winding, said stator winding having an effective ratio of reactance X to resistance R between the values zero and five and greater than the value 4 minus 6.5 $E/U$, wherein X is the effective reactance and R is the effective resistance looking into the stator winding from said input terminals, E is the electromotive force induced in said stator winding and U is the A.C. terminal voltage at said input terminals, and wherein the ratio $E/U$ lies between the values zero and 1.2.

2. A motor as described in claim 1 wherein the ratio $E/U$ is limited to the range of values which lie between 0.5 and 1.2.

3. A motor as described in claim 1 wherein the ratio $E/U$ is unity.

4. A motor as described in claim 1 wherein the ratio $X/R$ equals $\tan \alpha$ and wherein the parameters of said motor are arranged so that $E \cos \alpha/U$ lies within the range of values between 0.15 and 0.83.

5. A motor as described in claim 1 wherein the ratio $X/R$ equals $\tan \alpha$ and wherein the parameters of said motor are arranged so that $E \cos \alpha/U$ is 0.5.

6. A motor as described in claim 2 wherein the ratio $X/R$ equals $\tan \alpha$ and wherein the parameters of said motor are arranged so that $E \cos \alpha/U$ lies within the range of values between 0.15 and 0.83.

7. A motor as described in claim 1 wherein said rotor comprises a cylinder which is diametrically permanently magnetized.

8. A motor as described in claim 1 further comprising a capacitor connected in series with one of said input terminals and said stator winding.

9. A motor as described in claim 8 wherein said capacitor and said stator winding together form a circuit tuned approximately to series resonance at the frequency of said alternating current.

10. A self-starting motor as described in claim 1 wherein said stator comprises at least two asymmetrically shaped pole pieces arranged so that in the deenergized condition of said stator winding the permanent magnet rotor assumes a rest position in which the magnetic axis of one of its pole pairs makes an angle of at least five degrees with the resultant magnetic field of said stator pole.

11. A motor as described in claim 1 further comprising means associated with said stator for producing a rotating magnetic field and wherein said rotor further comprises a squirrel cage induction rotor affixed thereto to improve the starting characteristics of the motor.

12. A motor as described in claim 1 further comprising means associated with said stator for producing a rotating magnetic field and wherein said rotor is composed at least in part of a magnetic material which exhibits a broad hysteresis loop thereby to produce a hysteresis starting torque.

13. A synchronous motor comprising a stator composed of magnetic material, a stator winding mounted thereon, a cylindrical diametricaly magnetized permanent magnet rotor mounted to rotate within said stator, a pair of input terminals for supplying an alternating electric current to said stator winding, said stator winding having an effective ratio of reactance X to resistance R between the values zero and five and greater than the value 4 minus 6.5 $E/U$, the ratio $E/U$ being limited to the range of values between 0.5 and 1.2, wherein X is the effective reactance and R is the effective resistance looking into the stator winding from said input terminals, E is the electromotive force induced in said stator winding and U is the A.C. terminal voltage at said input terminals, said motor having the further characteristic that the function $E/U$ versus $\alpha$ lies within the area bounded by the heavy lines in FIG. 3 of the attached drawing, wherein $\alpha$ is the angle whose tangent is $X/R$.

References Cited

UNITED STATES PATENTS

| | | | |
|---|---|---|---|
| 2,214,850 | 9/1940 | Arey | 310—163 |
| 2,601,517 | 6/1952 | Hammes | 310—162 XR |
| 2,949,553 | 8/1960 | Benoit | 310—162 |
| 2,040,508 | 5/1936 | Thompson | 310—163 XR |

LEE T. HIX, *Primary Examiner.*

D. F. DUGGAN, *Assistant Examiner.*

UNITED STATES PATENT OFFICE
CERTIFICATE OF CORRECTION

Patent No. 3,375,384                                March 26, 1968

Richard Thees

It is certified that error appears in the above identified patent and that said Letters Patent are hereby corrected as shown below:

Column 3, line 63, after "the", second occurrence, insert -- stator --; line 64, cancel "stator"; line 68, after "and" insert -- satisfactorily approximate and theoretical power limit --.

Signed and sealed this 10th day of March 1970.

(SEAL)
Attest:

Edward M. Fletcher, Jr.                          WILLIAM E. SCHUYLER, JR.

Attesting Officer                                         Commissioner of Patents

UNITED STATES PATENT OFFICE
CERTIFICATE OF CORRECTION

Patent No. 3,375,384        Dated March 26, 1968

Inventor(s) RICHARD THEES

It is certified that error appears in the above-identified patent and that said Letters Patent are hereby corrected as shown below:

Col. 3, line 22, change "L/U" to -- E/U --;

Col. 3, line 39, change "L" to -- E --;

Signed and sealed this 28th day July 1970.

(SEAL)
Attest:

Edward M. Fletcher, Jr.
Attesting Officer

WILLIAM E. SCHUYLER, JR.
Commissioner of Patents